(12) United States Patent
Phelan et al.

(10) Patent No.: US 10,915,449 B2
(45) Date of Patent: Feb. 9, 2021

(54) PRIORITIZING DATA REQUESTS BASED ON QUALITY OF SERVICE

(71) Applicant: HEWLETT PACKARD ENTERPRISE DEVELOPMENT LP, Houston, TX (US)

(72) Inventors: Thomas A. Phelan, San Francisco, CA (US); Michael J. Moretti, Saratoga, CA (US); Joel Baxter, San Carlos, CA (US); Gunaseelan Lakshminarayanan, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 377 days.

(21) Appl. No.: 14/571,643

(22) Filed: Dec. 16, 2014

(65) Prior Publication Data

US 2015/0178133 A1    Jun. 25, 2015

Related U.S. Application Data (60) Provisional application No. 61/918,446, filed on Dec. 19, 2013.

(51) Int. Cl.
*G06F 9/46* (2006.01)
*G06F 12/0871* (2016.01)
(Continued)

(52) U.S. Cl.
CPC .......... *G06F 12/0871* (2013.01); *G06F 3/067* (2013.01); *G06F 3/0644* (2013.01);
(Continued)

(58) Field of Classification Search
CPC .. G06F 12/126; G06F 2201/885; G06F 3/067; G06F 3/0644; G06F 9/5077; G06F 12/0871; G06F 9/5016; G06F 9/4881; G06F 12/0855; G06F 12/0253; G06F 12/0802; H04L 67/1097; H04L 67/1023
See application file for complete search history.

(56) References Cited

U.S. PATENT DOCUMENTS

2004/0230753 A1* 11/2004 Amiri ............... G06F 9/5016
711/147
2008/0250415 A1* 10/2008 Illikkal .............. G06F 9/5077
718/103

(Continued)

OTHER PUBLICATIONS

Zhang et al, "A Distributed Cache for Hadoop Distributed File System in Real-time Cloud Services" 2012, pp. 12-21 <cacheHdoop_2012.pdf>.*

*Primary Examiner* — Tuan A Vu
(74) *Attorney, Agent, or Firm* — Hewlett Packard Enterprise Patent Department (57) ABSTRACT

Systems, methods, and software described herein facilitate servicing of data requests based on quality of service assigned to processing jobs. In one example, a method of prioritizing data requests in a computing system based on quality of service includes identifying a plurality of data requests from a plurality of processing jobs. The method further includes prioritizing the plurality of data requests based on a quality of service assessed to each of the plurality of processing jobs, and assigning cache memory in the computing system to each of the plurality of data requests based on the prioritization.

19 Claims, 7 Drawing Sheets

(51) Int. Cl.
  *G06F 9/50* (2006.01)
  *G06F 3/06* (2006.01)
  *G06F 12/126* (2016.01)
  *H04L 29/08* (2006.01)

(52) U.S. Cl.
  CPC .......... *G06F 9/5016* (2013.01); *G06F 9/5077* (2013.01); *G06F 12/126* (2013.01); *G06F 2201/885* (2013.01); *G06F 2209/5021* (2013.01); *G06F 2212/311* (2013.01); *G06F 2212/6042* (2013.01); *H04L 67/1097* (2013.01)

(56) References Cited

U.S. PATENT DOCUMENTS

| | | | |
|---|---|---|---|
| 2009/0172315 A1* | 7/2009 | Iyer | G06F 9/5016 711/158 |
| 2013/0074087 A1* | 3/2013 | Chambliss | G06F 9/4881 718/103 |
| 2014/0156965 A1* | 6/2014 | Yang | G06F 12/0253 711/172 |
| 2014/0195686 A1* | 7/2014 | Yeager | H04L 67/1023 709/226 |
| 2014/0195770 A1* | 7/2014 | Nishtala | G06F 3/0644 711/173 |
| 2015/0143053 A1* | 5/2015 | Quimbey | G06F 12/0855 711/133 |

* cited by examiner

PRIORITIZING DATA REQUESTS BASED ON QUALITY OF SERVICE

TECHNICAL FIELD

This application hereby claims the benefit of and priority to U.S. Provisional Patent Application 61/918,446, entitled "PRIORITIZING DATA CALLS BASED ON QUALITY OF SERVICE," filed on Dec. 19, 2013, and which is hereby incorporated by reference in its entirety.

TECHNICAL FIELD

Aspects of the disclosure are related to computing hardware and software technology, and in particular to prioritizing data requests based on a quality of service.

TECHNICAL BACKGROUND

An increasing number of data-intensive distributed applications are being developed to serve various needs, such as processing very large data sets that generally cannot be handled by a single computer. Instead, clusters of computers are employed to distribute various tasks, such as organizing and accessing the data and performing related operations with respect to the data. Various applications and frameworks have been developed to interact with such large data sets, including Hive, HBase, Hadoop, Amazon S3, and CloudStore, among others.

At the same time, virtualization techniques have gained popularity and are now commonplace in data centers and other environments in which it is useful to increase the efficiency with which computing resources are used. In a virtualized environment, one or more virtual machines are instantiated on an underlying computer (or another virtual machine) and share the resources of the underlying computer. However, deploying data-intensive distributed applications across clusters of virtual machines has generally proven impractical due to the latency associated with feeding large data sets to the applications. Further, when a plurality of processing jobs is distributed across the clusters, prioritization of the jobs may be necessary to properly allocate the computing resources.

OVERVIEW

Provided herein are systems, methods, and software for prioritizing data calls based on quality of service. In one example, a method of prioritizing data requests in a computing system based on quality of service includes identifying a plurality of data requests from a plurality of processing jobs. The method further includes prioritizing the plurality of data requests based on a quality of service assessed to each of the plurality of processing jobs, and assigning cache memory in the computing system to each of the plurality of data requests based on the prioritization.

In another example, a computer apparatus to prioritize a plurality of data requests for a plurality of processing jobs includes processing instructions that direct a computing system to identify the plurality of data requests from the plurality of processing jobs. The processing instructions further direct the computing system to prioritize the plurality of data requests based on a quality of service assessed to each of the plurality of processing jobs, and assign cache memory to each of the plurality of data requests based on the prioritization. The computer apparatus further includes one or more non-transitory computer readable media that store the processing instructions.

In a further instance, a system to prioritize and service data requests includes a plurality of processing jobs executing on a computing system configured to initiate a plurality of data requests. The system further includes a cache service configured to identify the plurality of data requests, prioritize the plurality of data requests based on a quality of service assessed to each of the plurality of processing jobs, and assign cache memory to each of the plurality of data requests based on the prioritization.

This Overview is provided to introduce a selection of concepts in a simplified form that are further described below in the Technical Disclosure. It should be understood that this Overview is not intended to identify key features or essential features of the claimed subject matter, nor is it intended to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Various implementations described herein provide for prioritizing data calls and file system requests based on quality of service. In particular, large-scale processing frameworks (LSPFs) or applications have been developed to process vast amounts of data from storage volumes using one or more processing systems. These processing systems may include real processing systems, such as server computers, desktop computers, and the like, as well as virtual elements or machines executing via host computing systems.

In at least one implementation, one or more virtual machines are instantiated within a host environment. The virtual machines may be instantiated by a hypervisor running in the host environment, which may run with or without an operating system beneath it. For example, in some implementations the hypervisor may be implemented at a layer above the host operating system, while in other implementations the hypervisor may be integrated with the operating system. Other hypervisor configurations are possible and may be considered within the scope of the present disclosure.

The virtual machines may include various guest processes, such as a guest operating system and its components, guest applications, and the like, that consume and execute on data. The virtual machines may also include virtual representations of various computing components, such as guest memory, a guest storage system, and a guest processor.

In operation, a guest element running within the virtual machine, such as a LSPF for working with large data sets, may require data for processing. This framework or application is used to take data from one or more storage volumes, and process the data in parallel with one or more other virtual or real machines. The framework may include Hadoop, High Performing Computing Cluster (HPCC), or some other similar LSPF.

In the present example, a distributed file system and a cache service that prioritizes data requests based at least in part on the identification of the job being processed are included. For example, as more jobs are dispersed across the system, each of the jobs may require a different priority from other jobs using the same resources. In some examples, the different priority allows data calls initiated by each of the jobs to be handled based on the quality of service allocated to the particular job. This quality of service may be assigned by an administrator, may be assigned by the user generating each of the jobs, may be assigned based on the type of job, or may be assigned by any other means. As a result of the prioritization, if more than one job requires data from the distributed file system at the same instance, the job with the higher quality of service will receive service before the job with the lower quality of service.

Figure 1A:
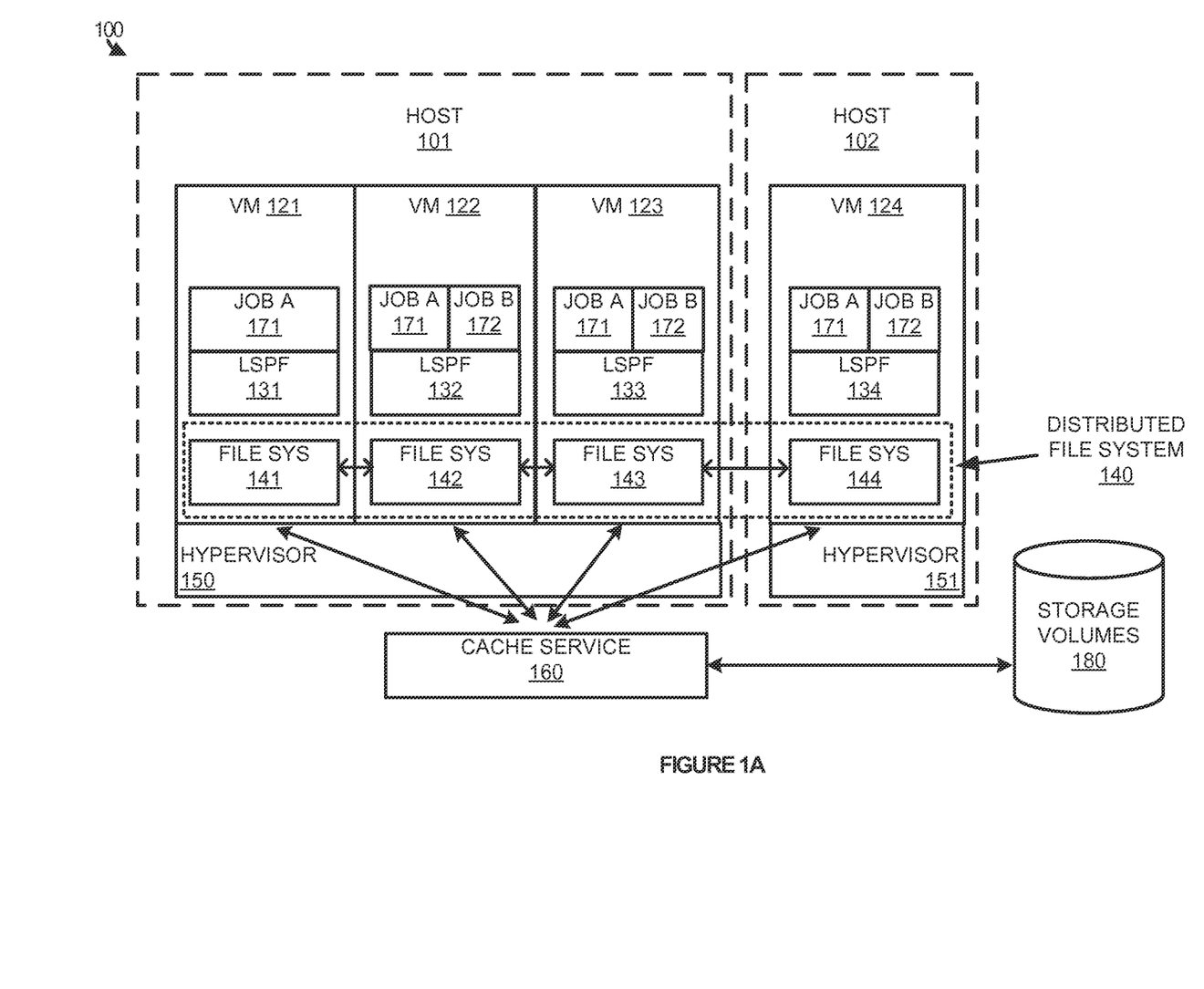
FIG. 1A illustrates a system to prioritize data requests based on quality of service according to one example.

Referring now to FIG. 1A, FIG. 1A illustrates a system 100 for prioritizing data requests in a file system. System 100 includes hosts 101-102, virtual machines 121-124, hypervisors 150-151, cache service 160, and storage volumes 180. Virtual machines 121-124 further include LSPF instances 131-134, and file system instances 141-144 as part of distributed file system 140. Cache service 160 is used to communicate with storage volumes 180, which may be located locally in the hosts or externally from the hosts, to help supply data to virtual machines 121-124. Although illustrated external from hosts 101-102, it should be understood that cache service 160 might be configured to communicate with cache nodes within each of hosts 101-102. Additionally, in some examples, cache service 160 may be implemented within hosts 101-102, and may be configured to work directly with distributed file system 140.

In operation, hypervisors 150-151 may be used to instantiate virtual machines 121-124 on hosts 101-102. Virtual machines 121-124 are used to process large amounts of data and may include various guest elements, such as a guest operating system and its components, guest applications, and the like. The virtual machines may also include virtual representations of computing components, such as guest memory, a guest storage system, and a guest processor.

Within virtual machines 121-124, LSPF instances 131-134 are used to process large amounts of data from storage volumes 180. LSPF instances 131-134 are used to support data-intensive distributed applications, and support parallel running of applications on large clusters of commodity hardware. LSPF instances 131-134 may include the Hadoop open source framework, but may also include Hive, HPCC, and CloudStore, among others.

During execution on the plurality of virtual machines, LSPF instances 131-134 may require new data for processing job A 171 and job B 172. These LSPF jobs represent analysis to be completed via the LSPF instances, including identifying the number of occurrences that something occurs in a data set, where something happens in the data set, amongst other possible analysis. Using frameworks like Hadoop allows the jobs to be dispersed across various physical machines and virtual computing elements on the physical machines. By dispersing the workload, it not only reduces the amount of work that each processing element must endure, but also accelerates results to the data queries.

A typical framework, such as Hadoop, that spreads data processing amongst the physical and virtual machines requires a file system to ensure the data is processed efficiently between the different nodes. In the present example, to provide greater control over the operations of the file system, users or administrators of data analysis system 100 may prefer to adjust the file system based on a quality of service for jobs executing in the data processing environment. Referring again to FIG. 1A, job A 171 may have a higher priority than job B 172. This may be due to a need of job A 171 to be completed faster, a higher price allocation to job A 171 over job B 172, or any other factor to determine priority. As a result, if both job A 171 and job B 172 require data at the same instance, job A 171 would be serviced before job B 172. To accomplish this prioritized system, distributed file system 140 and cache service 160 may employ a hierarchical structure to the data calls from the various jobs. In some examples, distributed file system 140 and cache service 160 may be configured such that when calls for multiple jobs are received at or about the same instance, the file system will recognize the job making each of the calls, and process the calls based on the prioritization. Thus, although the jobs made their request at or near the same instance, the job with the higher priority would receive data from the storage volumes first.

In some examples, to retrieve the data from the storage volumes based on priority, a memory cache may be implemented in hosts 101-102. This memory cache allows data to be temporarily stored for use by jobs 171-172 and is shared by jobs 171-172. Accordingly, when data requests occur for each of the jobs, portions of the memory may be assigned to each of the requests based on priority. If all portions of the cache memory have been assigned, then outstanding data requests will remain pending, and be allocated to cache memory as portions become available based their priority.

Although illustrated as being processed within the same virtual machine in the present instance, it should be understood that job A 171 and job B 172 might be implemented on separate virtual machines in some examples. Further, although the present example provides four virtual machines to process jobs 171-172, it should be understood that the jobs 171-172 could be processed using any number of virtual or real machines with a LSPF. Moreover, although system 100 includes LSPF instances executing within virtual machines, it should be understood that the LSPF instances might be executed on one or more real machines in addition to or in place of the virtual machines.

Figure 1B:
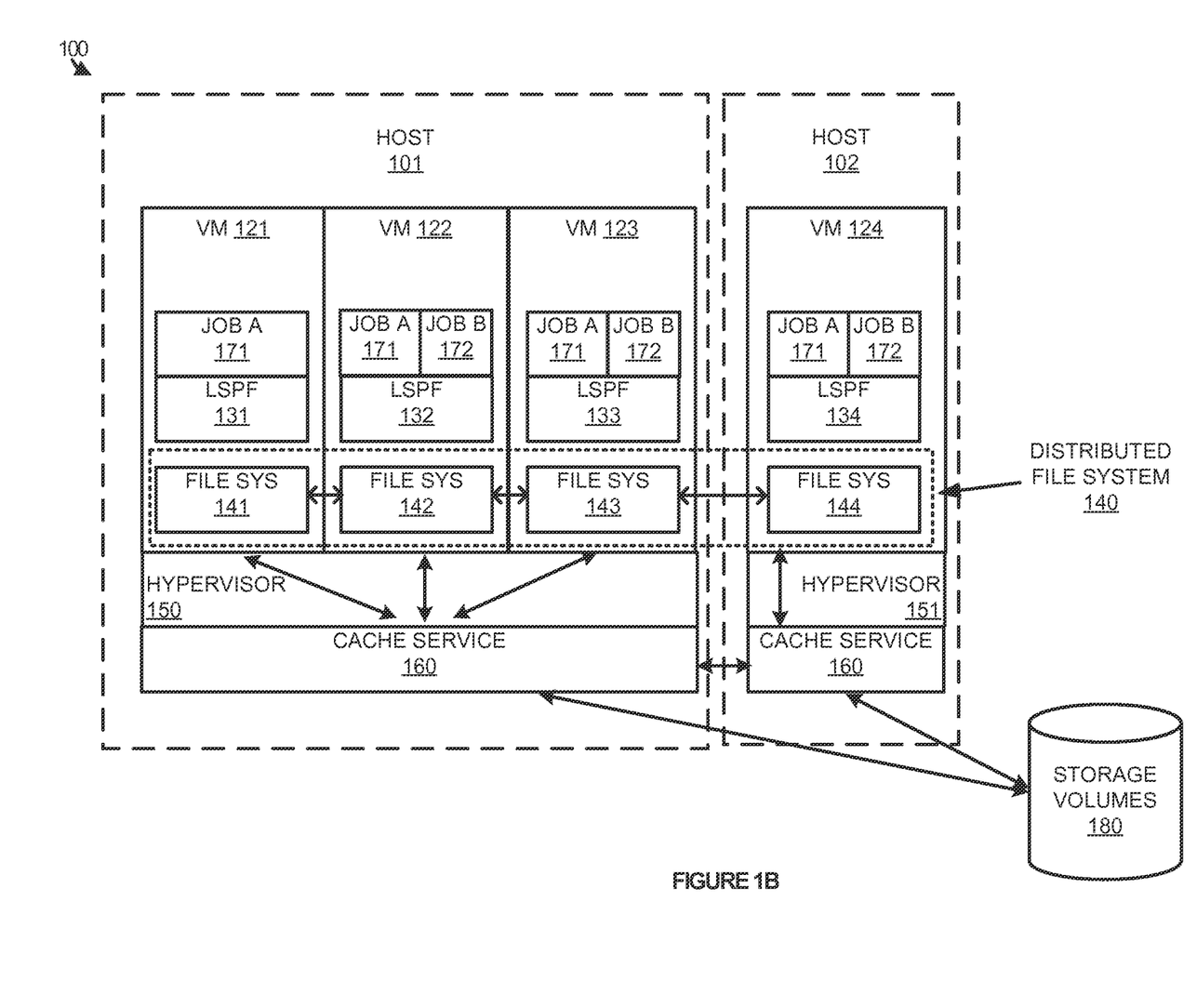
FIG. 1B illustrates a system to prioritize data requests based on quality of service according to one example.

As another example, FIG. 1B is included to illustrate another implementation of cache service 160 in a system for prioritizing data requests. As illustrated in FIG. 1B, cache service 160 may be implemented within hosts 101-102. By implementing the service within the hosts, cache service 160 may quickly interact with or be an extension of distributed file system 140. Thus, cache service 160 can quickly gather the data necessary for LSPF instances 131-134 based on the quality of service. Although illustrated as its own module, it should be understood that cache service 160 might be implemented within hypervisors 150-151 in some examples. Further, it should be understood that although cache service 160 may reside on multiple hosts, cache service 160 might communicate between these hosts.

Figure 2:
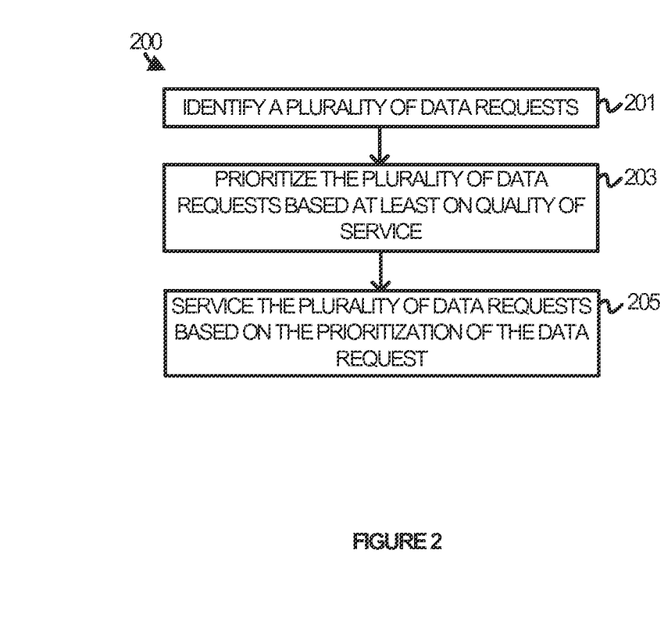
FIG. 2 illustrates a method of prioritizing data requests based on quality of service.

Referring now to FIG. 2, FIG. 2 illustrates a method 200 of prioritizing data requests based on quality of service according to at least one example. Method 200 includes identifying a plurality of data requests from a plurality of processing jobs (201). In response to identifying the data requests, the method further provides prioritizing the plurality of data requests based at least on a quality of service assessed to each of the plurality of processing jobs (203). In some examples, multiple jobs working on data sets may require data items for processing at or near the same instance. Thus, the file system and cache service may be required to prioritize the requests for the various jobs within the system. In the present example, this prioritization is accomplished based at least in part on the quality of service, which may be defined by an administrator of the data processing system, may be defined on a level of service specified by the customer, or may be defined by any other similar basis. For example, a first user may require a faster response to a data query, and as a result be allocated a higher quality of service than a second user. If the jobs for the first user and the second user both require data at or near the same instance, the file system and cache service may be configured to prioritize the data request for the first user ahead of the data request for the second user. Once the plurality of data requests have been prioritized, the method further includes servicing the plurality of data requests based on their priority (205).

In at least one example, the process of servicing the plurality of data requests based on their priority includes assigning cache memory to each of the job requests based on their priority. Referring to FIGS. 1A and 1B, cache service 160 may be used to retrieve data from storage volumes 180 and provide the data to locations in memory accessible by processing jobs 171-172. Once placed in cache memory, processing jobs 171-172 may perform the necessary operations using LSPF instances 131-134. In some instances, the cache memory that is provided to the processing jobs may be limited, resulting in an inadequate number of cache locations to service all of the data requests. Accordingly, rather than servicing each of the data requests equally, cache service 160 may cache the higher priority job requests first, and fill the remainder of the cache memory with the lesser priority requests. For example, job A 171 may have a higher quality of service than job B 172. Thus, when both jobs request data at or near the same instance, distributed file system 140 and cache service 160 may service or allocate cache memory to the requests of job A 171 prior to the requests of job B 172.

Figure 3:
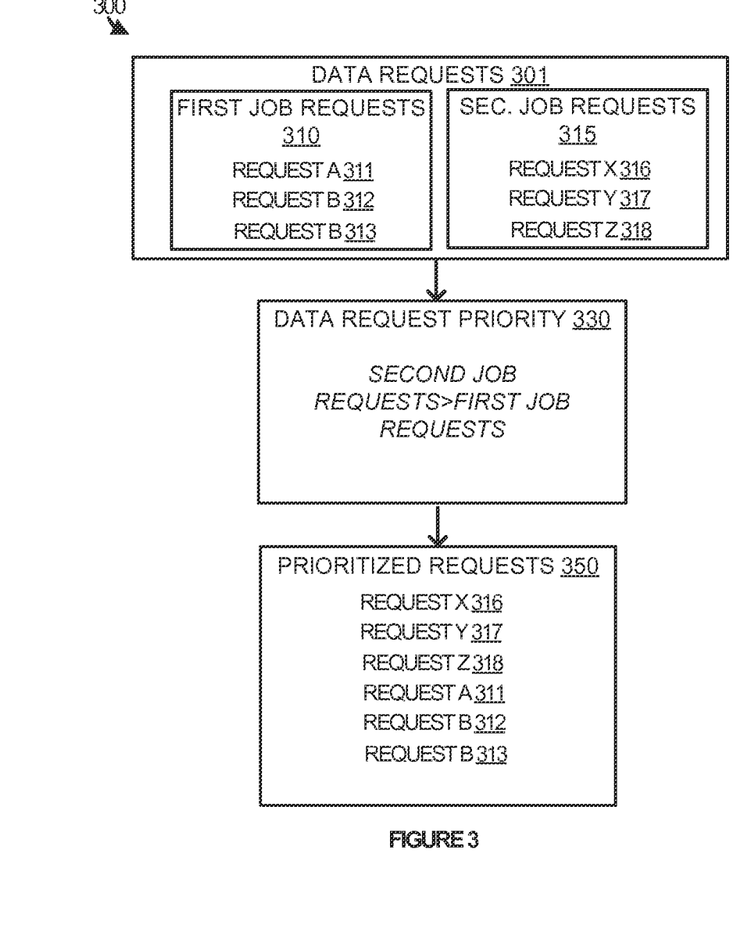
FIG. 3 illustrates a flow diagram of prioritizing data requests based on quality of service.

Turning to FIG. 3 to further demonstrate the prioritization operation, FIG. 3 illustrates a flow diagram 300 of prioritizing data requests based on quality of service. Overview 300 includes data requests 301, data request priority 330, and prioritized requests 350. Data requests 301 further include first job requests 310 and second job requests 315. Job requests 310 and 315 are used to represent data requests for processing jobs in LSPFs such as Hadoop, Hive, HPCC, CloudStore, or other LSPFs.

In operation, LSPF instances may be implemented on a plurality of processing nodes. Each of these processing nodes may reside on its own computing system, such as a server, desktop computer, and the like, or may reside on a virtual machine implementation of the computing system. Further, the jobs assigned to these processing nodes may exist on separate processing nodes, or may be implemented on the same processing node. The jobs may be used to analyze a plurality of data sets located in one or more storage repositories or volumes. In the present example, first job requests 310 and second job requests 315 are required for first and second processing jobs. These jobs may include a variety of operations on data, including the number of times an item is present in the data, associations of items within the data, locations of items within the data, amongst other possible data operations. Here, first job requests 310 include requests 311-313, and second job requests 315 include requests 316-318. Once the requests are identified at the file system level, the file system and cache service are configured to implement data request priority 330, which defines second job requests to be of a greater priority than the first job requests. Data request priority 330 may be configured based on a quality of service, which may be defined by the customer, an administrator, or any other method of defining the priority of the jobs.

Once the data requests are identified, the file system and cache service are configured to produce prioritized requests 350. Prioritized requests 350 allow second job requests 315 to be placed in a higher priority than first job requests 310. Thus, requests 316-318 are at a higher priority level than requests 311-313, and may be processed accordingly.

In the present example, first job requests 310 and second job requests 315 may be initiated from the same virtual machine or different virtual machines. As a result, file system priority may be implemented on each virtual machine individually for co-pending jobs, or may be communicated across multiple virtual machines to ensure that the proper job is receiving data service based on the quality of service.

In some instances, upon generating prioritized requests 350, cache memory may be allocated to service the requests. This cache memory, managed by a cache service, such as cache service 160, allows data to be temporarily stored in locations accessible by both the first and second jobs. Accordingly, as data is requested by the first and second jobs, portions of the memory may be allocated based on priority until the cache memory is exhausted. Once exhausted, remaining data requests wait until memory locations are again available to cache data.

Figure 4:
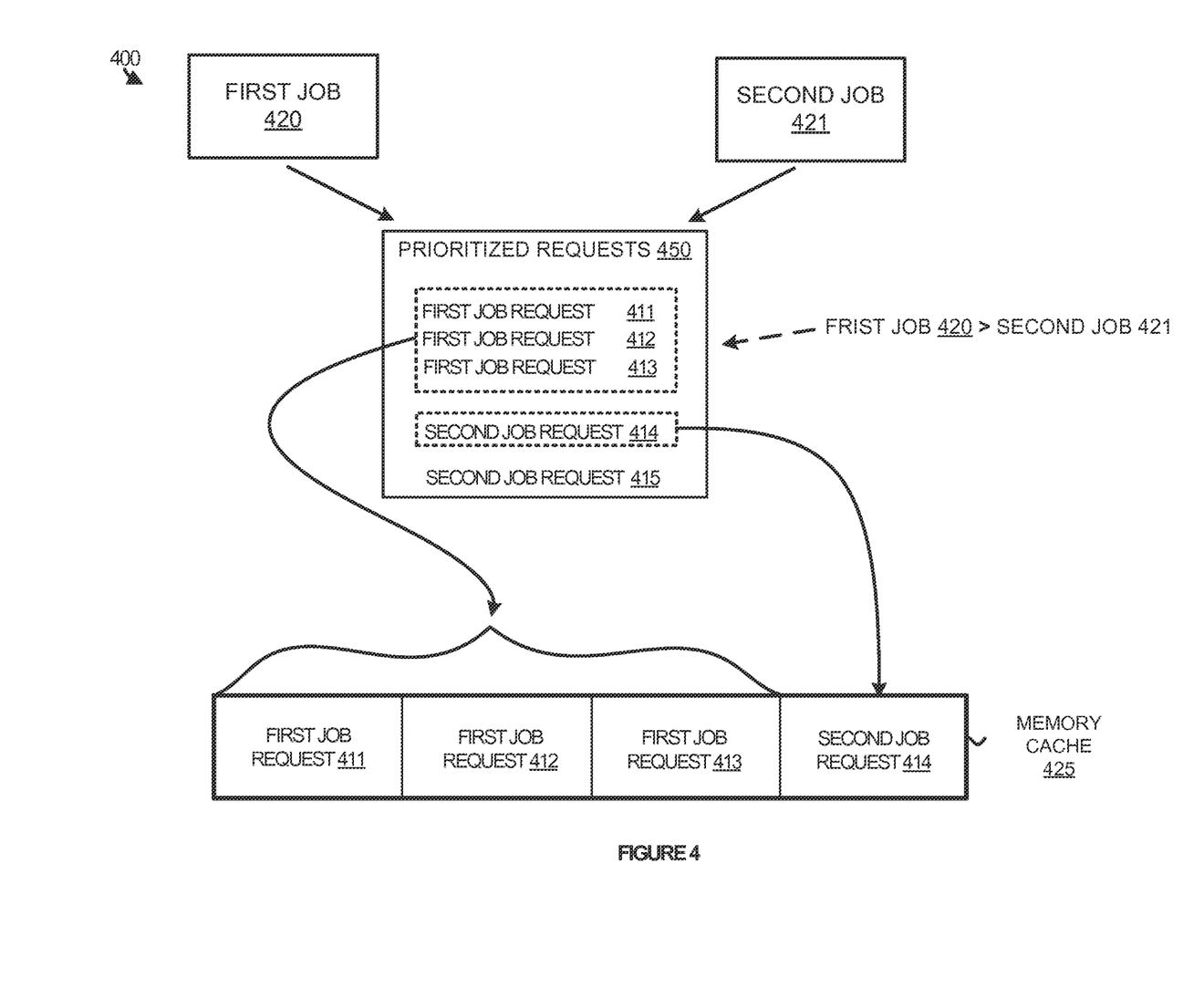
FIG. 4 illustrates an overview of prioritizing data requests based on quality of service.

To further demonstrate the assignment of cache memory, FIG. 4 is provided. FIG. 4 illustrates an overview 400 of prioritizing data requests based on quality of service. FIG. 4 includes processing jobs 420-421, prioritized requests 450, and memory cache 425, which is shared between processing jobs 420-421. In operation, first job 420 and second job 421 may be initiated on one or more processing nodes to accomplish desired LSPF tasks. Once initiated, first job 420 and second job 421 may require various data elements for the operations within the processing nodes. Accordingly, as illustrated in overview 400, first job requests 411-413 are generated at or near the same instance as second job requests 414-415.

In response the data requests, a cache service with the assistance of a file system may prioritize the requests to generate prioritized requests 450. In the present example, first processing job 420 is assigned a higher quality of service than second processing job 421. This quality of service may be defined by an administrator, by a user, by the type of data for the processing jobs, or by any other method of defining the quality of service. Accordingly, prioritized requests allow first job requests 411-413 to be of higher priority than second job requests 414-415.

Once the data requests are prioritized, the requests may be serviced based on the prioritization. Here, memory cache 425 for jobs 420-421 includes enough memory locations to provide a temporary cache for four of the data requests, but not all of the data requests. Thus, based on the request prioritization and the cache service, three portions of the memory cache may be assigned to first job requests 411-413, while a single memory cache portion is provided to second job request 414. As a result of the limited availability in memory cache 425, second job request 415 remains pending until locations in memory cache 425 are made available. However, if additional requests are issued for first job 420, these new requests may take a higher priority than second job request 415.

Although not illustrated in FIG. 4, it should be understood that in some examples a minimum amount of memory might be allocated to each of the processing jobs. Thus, even if first job 420 included enough requests to consume all of the memory locations in memory cache 425, second job 421 may be allocated a minimum portion of memory to ensure that the processing of second job 421 does not halt due to first job 420.

Further, in some examples, processing jobs 420-421 may execute on one or more virtual machines that abstract the physical elements of a host computing system. In this instance, memory cache 425 may comprise a shared memory space that allows one or more processes executing on the host to access the shared memory locations, and also allow processing jobs 420-421 to access the same memory locations. For example, when first job 420 requests data, a cache service executing at least partially on the host may identify the data within one or more storage repositories, and provide the data to a shared memory location. Once cached in the shared memory location, first job 420 may access and process the data as required. Thus, instead of requiring a separate write into the virtual machine, the cache service on the host may write directly to cache memory 425 that is accessible by processes in the virtual machine.

Figure 5:
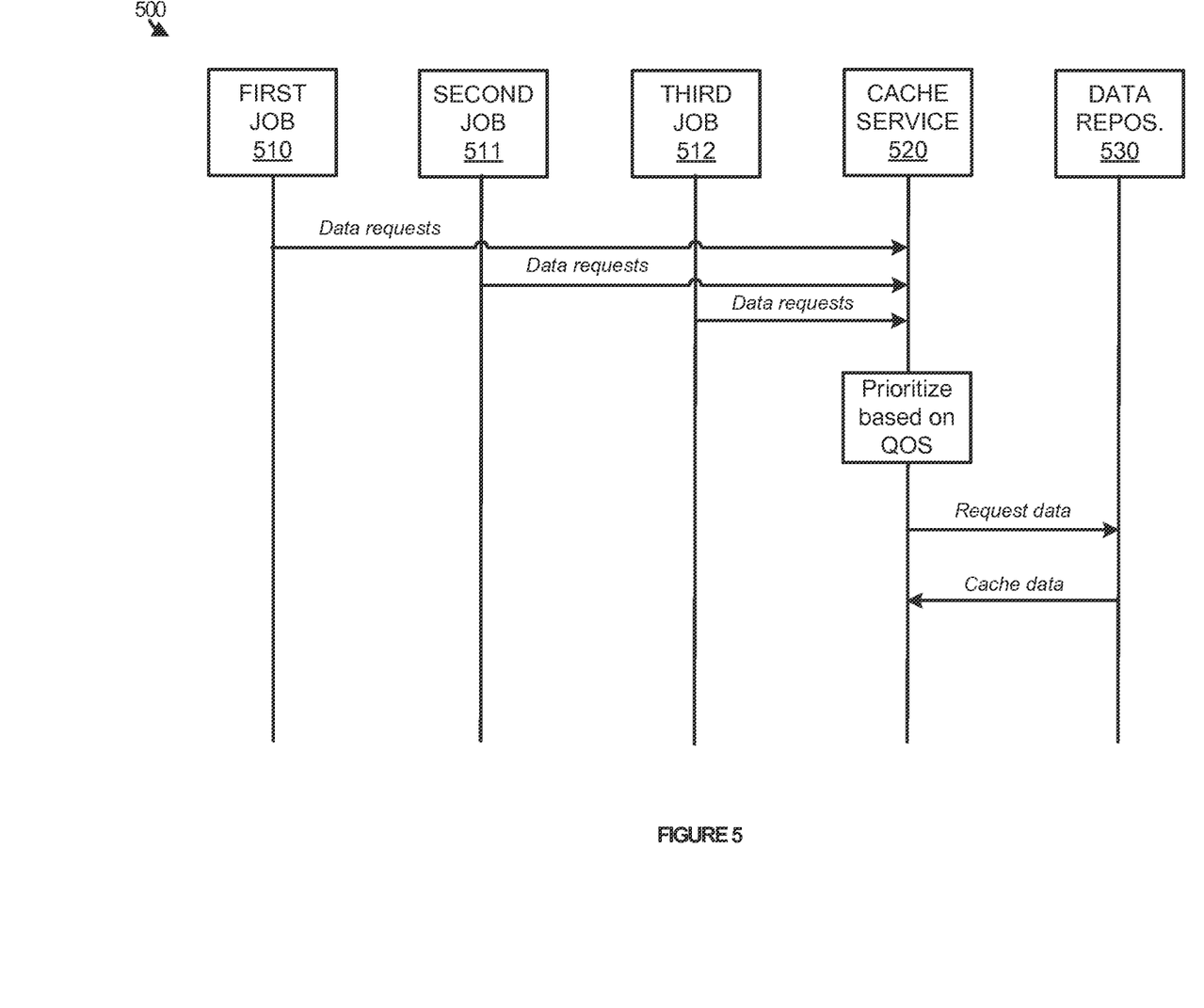
FIG. 5 illustrates a timing diagram of prioritizing data requests based on quality of service.

Referring to FIG. 5, FIG. 5 illustrates a timing diagram 500 of prioritizing data requests based on quality of service. Timing diagram 500 includes processing jobs 510-512, cache service 520, and data repositories 530. In operation, processing jobs 510-512 are each distributed to one or more real or virtual processing nodes to provide LSPF processing. During the execution of processing jobs 510-512, data requests are generated to provide the necessary data objects for processing within each of the processing nodes.

Upon a data request being generated, cache service 520, which may work with a distributed file system presented to each of the processing nodes, prioritizes each of the requests based on a quality of service setting for each of the jobs. For example, first processing job 510 may have a higher quality of service than second processing job 511, and second processing job 511 may have a higher quality of service than third processing job 512. Accordingly, when data requests are generated at or about the same instance for each of the processing jobs, cache service 520 will service the jobs in order of their quality of service.

In some examples, the servicing of the data requests includes determining the order at which data will be retrieved from data repositories 530. For instance, if processing jobs 510-512 ail requested data at or near the same instance, the data for first processing job 510 would be provided before processing jobs 511-512. Further, in some examples, processing jobs 510-512 may share a limited amount of cache memory that is accessible to each of the processing nodes. As a result, based on the quality of service assigned to each of the processing jobs, data requests may be assigned cache memory to handle each of the requests. However, if cache memory is exhausted prior to reaching a lower quality of service request, the request may be preserved until cache memory becomes available.

For example, first processing job 510 may require a large amount of cache memory to service a string of data requests. Accordingly, if third processing job 512 also required a large amount of cache memory for data requests, the third processing job requests may remain pending until the first processing jobs are completed. Once first processing job 510 frees up memory portions, cache service 520 may assign new cache memory to third processing job 512 and gather data from data repositories 530. In some examples, each of processing jobs 510-512 may be allocated a minimum amount of memory to prevent starvation of each of the processes. Consequently, even if a first processing job had a lower quality of service than one or more other processing jobs, the first processing job would continue to retrieve data from data repositories 530 using the minimum amount of allocated memory.

Figure 6:
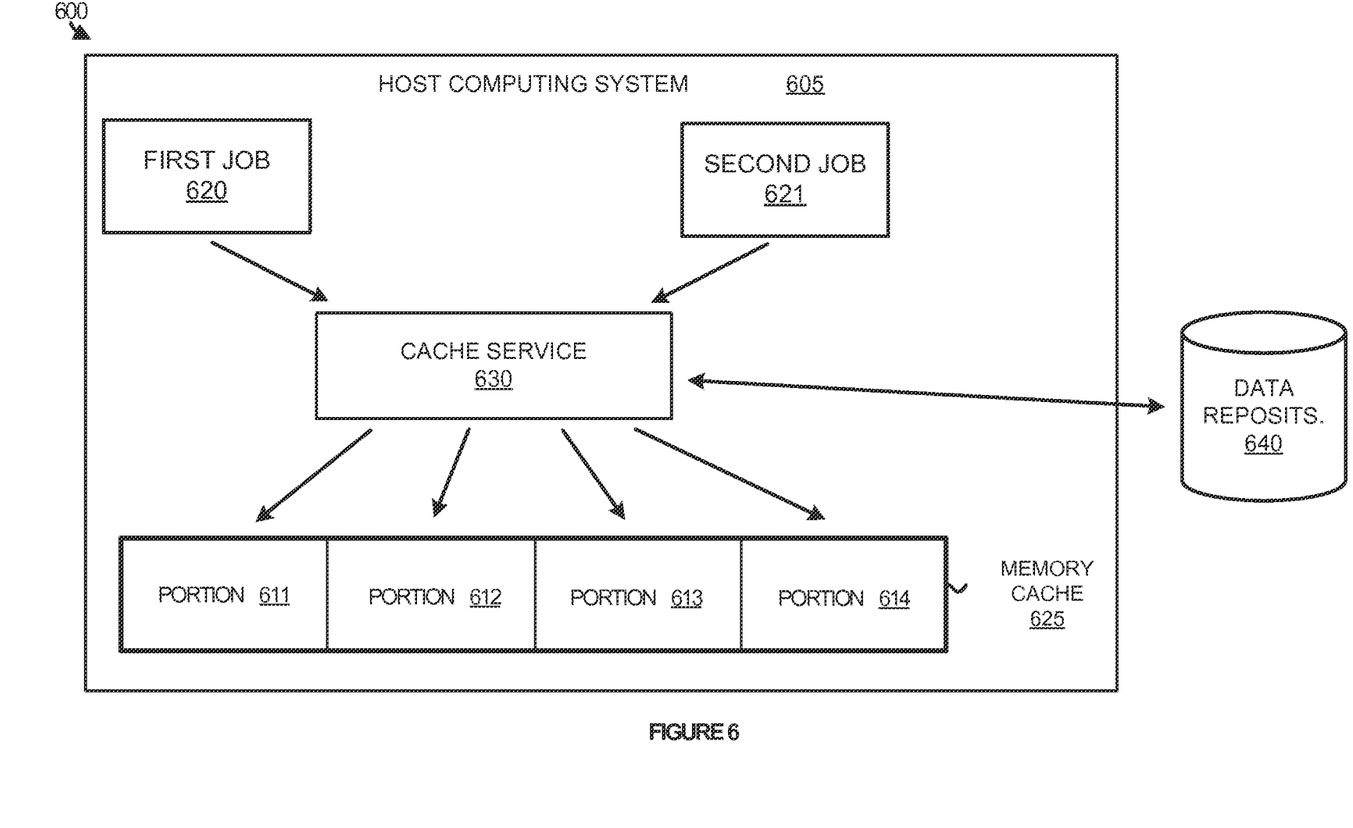
FIG. 6 illustrates a computing environment to service data requests based on quality of service.

Turning to FIG. 6, FIG. 6 illustrates a computing environment 600 to service data requests based on quality of service. Computing environment 600 includes host computing system 605 and data repositories 640. Host computing system 605 is configured as a platform to execute processing jobs 620-621 that provide operations on data sets stored in data repository 640. In the present example, host computing system 605 includes cache service 630 that is used as an interface between processing jobs 620-621 and data repositories 640. Accordingly, with the assistance of a file system, cache service 630 may identify a plurality of data requests from first processing job 620 and second processing job 621.

Once the data requests are identified, cache service 630 prioritizes the requests based on a quality of service assigned to each of the jobs. Based on the prioritization, cache service 630 then services the data requests. As depicted in the present example, memory cache 625 is provided that is used to temporarily store data for access by processing jobs 620-621. This temporary cache provides memory locations that are accessible by each of the jobs, and thus must be shared between the jobs. Accordingly, if first processing job 620 was provided a higher quality of service than second processing job 621, requests from first processing job 620 would be assigned portions from memory portions 611-614 prior to second processing job 621. Thus, if all the portions are being used by first processing job 620, second processing job 621 may have to wait for the first job to be completed before being provided cache memory locations.

Although not illustrated in the present example, it should be understood that processing jobs 620-621 might execute within one or more virtual machines that abstract the components of host computing system 605. By implementing the jobs across a plurality of virtual machines, jobs 620-621 may more efficiently use the resources of host computing system 605, while maintaining a shared memory cache 625 for necessary processing data.

Figure 7:
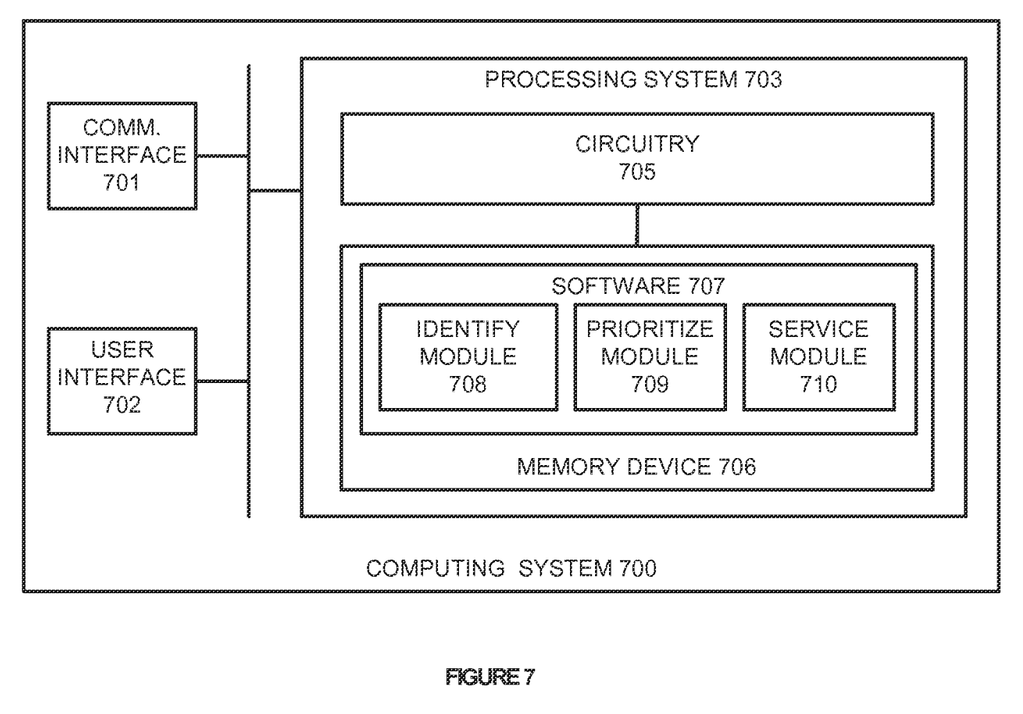
FIG. 7 illustrates a computing system to prioritize data requests based on quality of service.

Referring to FIG. 7, FIG. 7 illustrates a computing system 700 to prioritize data requests based on quality of service. Computing system 700 is representative of a computing system that may be employed in any computing apparatus, system, or device, or collections thereof, to suitably implement the cache service and file system prioritization operations described herein in FIGS. 1-6. Computing system 700 comprises communication interface 701, user interface 702, and processing system 703. Processing system 703 is communicatively linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes identify module 708, prioritize module 709, and service module 710, although any number of software modules may provide the same operation. Operating software 707 may further include an operating system, utilities, drivers, network interfaces, applications, or some other type of software. When executed by circuitry 705, operating software 707 directs processing system 703 to operate computing system 700 as described herein.

In particular, identify module 708, when executed by computing system 700, identifies data requests from a plurality processing jobs. As described herein, processing jobs may be deployed on shared computing resources to provide data processing capabilities to end users. As a result of sharing resources, prioritize module 709 prioritizes the data requests based on a quality of service that is assigned to each of the processing jobs. This quality of service may be assigned by an administrator, by the user generating the processing jobs, by the data required for the processing jobs, or any other quality of service definition mechanism. For example, a plurality of processing jobs may be deployed in a computing environment, wherein a first job is assigned a higher quality of service than one or more other jobs. Because of this higher quality of service, the first job may be given a higher priority level than the other jobs. Once the data requests are prioritized, service module 710 may be used to service the data requests based on the prioritization.

As described previously, the jobs deployed within a LSPF cluster may share resources including order of data retrieval and cache memory. Accordingly, based on the quality of service for each of the processing jobs, the order of retrieval and the cache memory allocation may be changed for the data requests. For example, if two processing jobs were implemented within a computing environment, and each requested data at or about the same instance, the data could be retrieved for each of the jobs based on their prioritization order. Further, based on the prioritization order, portions of cache memory may be allocated to each data request. However, if all of the memory locations within the cache memory were allocated to higher priority data requests, the lower priority requests may remain pending until memory locations become available.

In at least one example, a plurality of processing jobs may be deployed in a plurality of virtual machines instantiated on a host computing system. As a result of sharing the resources of the host computing system, the processing jobs may be forced to share cache memory that is used to cache data for the jobs across the virtual machines. This shared cache memory allows a process executing on the host, such as the cache service, to access the same memory locations as the processing jobs within the virtual machines. Thus, when data is required, the cache service may retrieve the data from one or more storage volumes and provide the data to the shared cache memory to be accessible to the processing jobs.

Returning to the elements of FIGS. 1A and 1B, Hosts 101-102 may include communication interfaces, user interfaces, processing systems, storage subsystems, or any other computing related device. Hosts 101-102 may comprise serving computing systems, desktop computing systems, laptop computing systems, or any other similar computing system. Although illustrated separately in FIG. 1A for clarity, it should be understood that cache service 160 may be implemented as a process within hosts 101-102. Storage volumes 180 comprise any type of storage media capable of storing data in a Hadoop Distributed File System (HDFS), GlusterFS, Blob, or any other similar file system format.

Hosts 101-102 may communicate with storage volumes 180 using Time Division Multiplex (TDM), asynchronous transfer mode (ATM), IP, Ethernet, synchronous optical networking (SONET), hybrid fiber-coax (HFC), circuit-switched, communication signaling, wireless communications, or some other communication format, including improvements thereof. The communications may be a direct link, or can include intermediate networks, systems, or devices, and can include a logical network link transported over multiple physical links.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of prioritizing data requests in a host computing system executing a plurality of virtual machines, the method comprising:

identifying, in a cache service executing on the host computing system and shared by the plurality of virtual machines, a plurality of data requests from a plurality of large scale data processing framework (LSPF) jobs that are each executing on two or more virtual machines in the plurality of virtual machines;

in the cache service, prioritizing the plurality of data requests based on a quality of service assessed to each of the plurality of LSPF jobs; and in the cache service, assigning cache memory of the host computing system to each of the plurality of data requests based on the prioritization, wherein the cache memory comprises shared memory locations accessible on the host computing system by the plurality of LSPF jobs.

2. The method of claim 1 further comprising, in the cache service, retrieving data from one or more data repositories to service the plurality of data requests based on the prioritization, and caching the data in the cache memory.

3. The method of claim 1 further comprising identifying a minimum amount of the cache memory for each of the plurality of LSPF jobs, and wherein assigning the cache memory to each of the plurality of data requests based on the prioritization comprises assigning at least the minimum amount of the cache memory to at least one data request associated with each LSPF job in the plurality of LSPF jobs.

4. The method of claim 1 wherein the cache service comprises a shared service for the plurality of LSPF jobs that executes at least partially outside of the plurality of virtual machines on the host computing system.

5. The method of claim 1 wherein the LSPF jobs comprise Hadoop processing jobs.

6. The method of claim 1 further comprising identifying the quality of service assessed to each of the plurality of LSPF jobs from an administrator.

7. The method of claim 1 wherein assigning the cache memory in the host computing system to each of the plurality of data requests based on the prioritization comprises assigning the cache memory in the host computing system to each of the plurality of data requests based on the prioritization and availability of the cache memory.

8. A computer apparatus to operate a cache service on a host computing system to prioritize a plurality of data requests for a plurality of large scale processing framework (LSPF) jobs, wherein the cache service is shared by a plurality of virtual machines running on the host computing system, the computer apparatus comprising:

processing instructions that direct the host computing system, when executed by the host computing system, to:
identify the plurality of data requests from the plurality of LSPF jobs that are each executing on two or more virtual machines in the plurality of virtual machines;
prioritize the plurality of data requests based on a quality of service assessed to each of the plurality of LSPF jobs; and
assign cache memory of the host computing system to each of the plurality of data requests based on the prioritization, wherein the cache memory comprises shared memory locations accessible on the host computing system by the plurality of LSPF jobs; and one or more non-transitory computer readable media that store the processing instructions.

9. The computer apparatus of claim 8 wherein the processing instructions further direct the host computing system to retrieve data from one or more data repositories to service the plurality of data requests based on the prioritization, and cache the data in the cache memory.

10. The computer apparatus of claim 8 wherein the processing instructions further direct the host computing system to identify a minimum amount of the cache memory for each of the LSPF jobs, and wherein the processing instructions to assign the cache memory to each of the plurality of data requests based on the prioritization direct the host computing system to assign at least the minimum amount of the cache memory to at least one data request associated with each LSPF job in the plurality of LSPF jobs.

11. The computer apparatus of claim 8 wherein the cache service comprises a shared service for the plurality of LSPF jobs that executes at least partially outside of the plurality of virtual machines on the host computing system.

12. The computer apparatus of claim 8 wherein at least one of the plurality of LSPF jobs executes over two or more of the plurality of virtual machines.

13. The computer apparatus of claim 8 wherein the LSPF jobs comprise Hadoop processing jobs.

14. The computer apparatus of claim 8 further comprising identifying the quality of service assessed to each of the plurality of LSPF jobs from an administrator.

15. The computer apparatus of claim 8 wherein the processing instructions to assign the cache memory to each of the plurality of data requests based on the prioritization direct the host computing system to assign the cache memory to each of the plurality of data requests based on the prioritization and availability of the cache memory.

16. A system to prioritize and service data requests, the system comprising:

a plurality of virtual machines executing a plurality of large scale processing framework (LSPF) jobs on a host computing system;

a cache service executing on the host computing system and shared by the plurality of virtual machines configured to:
identify a plurality of data requests from the plurality of LSPF jobs that are each executing on two or more virtual machines in the plurality of virtual machines;
prioritize the plurality of data requests based on a quality of service assessed to each of the plurality of LSPF jobs; and
assign cache memory of the host computing system to each of the plurality of data requests based on the prioritization, wherein the cache memory comprises memory locations accessible by each LSPF job of the plurality of LSPF jobs.

17. The system of claim 16 wherein the cache service is further configured to:

retrieve data from one or more data repositories to service the plurality of data requests based on the prioritization; and cache the data in the cache memory.

18. The system of claim 16 wherein the cache service comprises a shared service for the plurality of LSPF jobs that executes at least partially outside of the plurality of virtual machines on the host computing system.

19. The system of claim 16 wherein at least one of the plurality of LSPF jobs executes over two or more of the plurality of virtual machines.

* * * * *